(12) United States Patent
Fisher

(10) Patent No.: US 9,481,321 B2
(45) Date of Patent: Nov. 1, 2016

(54) CORNER ASSEMBLY FOR VEHICLE INTERIORS

(71) Applicant: Halcore Group, Inc., Grove City, OH (US)

(72) Inventor: Eric Fisher, Columbus, OH (US)

(73) Assignee: Halcore Group, Inc., Grove City, OH (US)

( * ) Notice: Subject to any disclaimer, the term of this patent is extended or adjusted under 35 U.S.C. 154(b) by 0 days.

(21) Appl. No.: 14/676,504

(22) Filed: Apr. 1, 2015

(65) Prior Publication Data

US 2015/0284963 A1  Oct. 8, 2015

Related U.S. Application Data

(60) Provisional application No. 61/975,492, filed on Apr. 4, 2014.

(51) Int. Cl.
*E04B 2/00* (2006.01)
*B60J 5/00* (2006.01)
*B60R 13/02* (2006.01)
*B61D 1/00* (2006.01)

(52) U.S. Cl.
CPC ............... *B60R 13/02* (2013.01); *B61D 1/00* (2013.01); *B60R 2013/0293* (2013.01)

(58) Field of Classification Search
CPC ............ E04F 13/0864; E04F 13/0733; E04F 19/022; E04F 19/061; B60R 13/02; B60R 2013/0293; B61D 1/00
USPC ........................ 52/287.1, 288.1, 716.3, 716.5
See application file for complete search history.

(56) References Cited

U.S. PATENT DOCUMENTS

| 960,677 | A | * | 6/1910 | McGann | E04F 13/0733 |
|---|---|---|---|---|---|
| | | | | | 312/140 |
| 4,104,839 | A | * | 8/1978 | Balzer | E04F 19/028 |
| | | | | | 52/254 |
| 4,998,380 | A | * | 3/1991 | Adell | B60R 13/043 |
| | | | | | 49/462 |
| 5,542,222 | A | * | 8/1996 | Wilson | E04F 13/0864 |
| | | | | | 52/276 |
| 5,560,170 | A | * | 10/1996 | Ganser | E04F 19/024 |
| | | | | | 52/212 |

(Continued)

OTHER PUBLICATIONS

Karin Tetlow, Sustainable Extruded Aluminum Trim Profiles Deliver Aesthetics and Durability, Architectural Record's Continuing Education Center, http://continuingeducation.construction.com/article.php?L=300&C=899&P=4, Sponsored by Tamlyn, Jun. 2014, 5 pages.

(Continued)

*Primary Examiner* — James Buckle, Jr.
(74) *Attorney, Agent, or Firm* — Hovey Williams LLP

(57) ABSTRACT

A corner assembly comprising an elongated main portion including a central section opposed by first and second lip sections, with the first and second lip sections extending laterally from the central section. The corner assembly additionally comprises first and second flange sections extending generally laterally from the central section, with the first flange section extending generally parallel with the first lip section and the second flange section extending generally parallel with the second lip section. The first flange section is separated from the first lip section so as to present a first receiving channel and the second flange section is separated from the second lip section so as to present a second receiving channel. The corner assembly further comprises an elongated cap section operable to be securely positioned over the elongated main portion.

12 Claims, 5 Drawing Sheets

(56) References Cited

U.S. PATENT DOCUMENTS

| | | | | |
|---|---|---|---|---|
| 5,664,376 A * | 9/1997 | Wilson | ................ | E04F 13/0864 52/287.1 |
| 5,740,642 A * | 4/1998 | Koenig, Jr. | ............. | E04F 13/06 403/267 |
| 5,813,179 A * | 9/1998 | Koenig, Jr. | ............. | E04F 13/06 403/267 |
| 5,836,123 A * | 11/1998 | Gulino | ................. | E04F 19/024 52/288.1 |
| 6,311,442 B1 * | 11/2001 | Watanabe | ............... | E04B 2/707 156/91 |
| 6,341,458 B1 | 1/2002 | Burt | | |
| 6,553,732 B2 * | 4/2003 | Shaw | .................... | E04F 19/022 52/287.1 |
| 8,061,105 B2 * | 11/2011 | Haga | ..................... | E04B 2/7457 52/254 |
| 9,032,676 B2 * | 5/2015 | Yarmo | ................ | E04F 13/0733 52/287.1 |
| 2015/0225966 A1 * | 8/2015 | Gazlay | ................ | E04G 23/0296 52/287.1 |

OTHER PUBLICATIONS

Minoru Truck Bodies Ltd., http://www.minorutruckbodies.ca/extrusions.html, Brochure, Mar. 2014, 2 pages.

* cited by examiner

CORNER ASSEMBLY FOR VEHICLE INTERIORS

RELATED APPLICATIONS

This non-provisional patent application claims priority to U.S. Provisional Patent Application Ser. No. 61/975,492 filed on Apr. 4, 2014, and entitled "CORNER ASSEMBLY FOR VEHICLE INTERIORS," the entire disclosure of which is herein incorporated by reference in its entirety.

FIELD OF THE INVENTION

The present invention is directed to a corner assembly for vehicle interiors. In particular, the present invention is directed to a corner assembly that can be used to more effectively and efficiently improve fabrication, functionality, and aesthetics of vehicle interiors.

BACKGROUND

Many types of vehicles have furniture positioned within their interiors. For instance, emergency vehicles, such as ambulances, will often include various styles of cabinets, closets, shelving, or the like for holding tools, equipment, and medical supplies. Generally, such furniture will be formed with pieces/panels joined at right angles. Such right-angle joints are not preferred for use in vehicles because they can be hazardous to individuals riding in the vehicles. For instance, if a vehicle makes a sharp or sudden turn, a person that falls into such a right-angle joint can be injured.

To overcome concerns inherent with furniture formed with right-angle joints, certain types of furniture will use curved corner pieces to join pieces/panels of the furniture. Nevertheless, it is difficult to fabricate furniture having curved corner pieces using present fabrication processes. Furthermore, it is difficult to maintain the aesthetic appearance of the corner pieces during/after fabrication and/or during/after installation of the furniture within the vehicle. For example, in ambulance-type vehicles, the interior furniture is often constructed from aluminum. As such, the components of the furniture are generally secured together via weld. Because welding processes will degrade/deteriorate/deform the exterior surface and finish/color of the components being welded, such components often need to be re-painted/re-finished after fabrication.

In the case of curved corner pieces, it is often preferred that such corner pieces include an anodized finished. However, such anodized finishes can be severely degraded after being welded. Similarly, when the furniture is installed within the vehicle, the anodized finish on the corner pieces can become scratched, dinged, or otherwise deformed. To make matters more complicated, once such curved corner pieces have been incorporated with the furniture during the installation process, it is difficult to remove/replace them. As such, there is a need for a curved corner assembly that provides for a radially-curved joint, while at the same time being operable to maintain its aesthetic appearance after fabrication of the furniture and after installation of the furniture within a vehicle.

SUMMARY OF THE INVENTION

In one embodiment of the present invention, there is provided a corner assembly comprising an elongated main portion including a central section opposed by first and second lip sections, with the first and second lip sections extending laterally from the central section. The corner assembly additionally comprises first and second flange sections extending generally laterally from the central section, with the first flange section extending generally parallel with the first lip section and the second flange section extending generally parallel with the second lip section. The first flange section is separated from the first lip section so as to present a first receiving channel and the second flange section is separated from the second lip section so as to present a second receiving channel. The corner assembly further comprises an elongated cap section operable to be securely positioned over the elongated main portion.

In another embodiment of the present invention, there is provided a piece of furniture for an interior of a vehicle. The piece of furniture comprises a first side panel, a second side panel, and a corner assembly. The corner assembly comprises an elongated main portion including a central section opposed by first and second lip sections extending laterally from the central section, and first and second flange sections extending generally laterally from the central section. The first flange section extends generally parallel with the first lip section and the second flange section extends generally parallel with the second lip section. The first flange section is separated from the first lip section so as to present a first receiving channel and the second flange section is separated from the second lip section so as to present a second receiving channel. The corner assembly further comprises an elongated cap section operable to be securely positioned over the elongated main portion. A portion of the first side panel is received within the first receiving channel and a portion of the second side panel is received within the second receiving channel.

In yet another embodiment of the present invention, there is provided a method of making a piece of furniture for an interior of a vehicle. The piece of furniture comprises first and second side panels and a corner assembly. The method comprises the initial step of providing the corner assembly, which includes an elongated main portion and an elongated cap section, and with the main portion presenting first and second receiving channels. The method additionally includes the step of inserting a portion of the first side panel into the first receiving channel and securing the first side panel to the corner assembly. The method additionally includes the step of inserting a portion of the second side panel into the second receiving channel and securing the second side panel to the corner assembly. The method additionally includes the step of installing the cabinet within an interior of the vehicle. The method further includes the step of securing the elongated cap section over the main portion.

In still yet another embodiment of the present invention, there is provided a method of making a corner assembly for a vehicle interior. The method comprises the initial step of extruding an elongated main portion. The main portion includes an elongated main portion including a central section opposed by first and second lip sections extending laterally from the central section and first and second flange sections extending generally laterally from the central section. The first flange section is separated from the first lip section so as to present a first receiving channel and the second flange section is separated from the second lip section so as to present a second receiving channel. An additional step includes extruding an elongated cap section operable to be securely positioned over the elongated main portion. A further step includes treating the elongated cap section with a surface finish.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
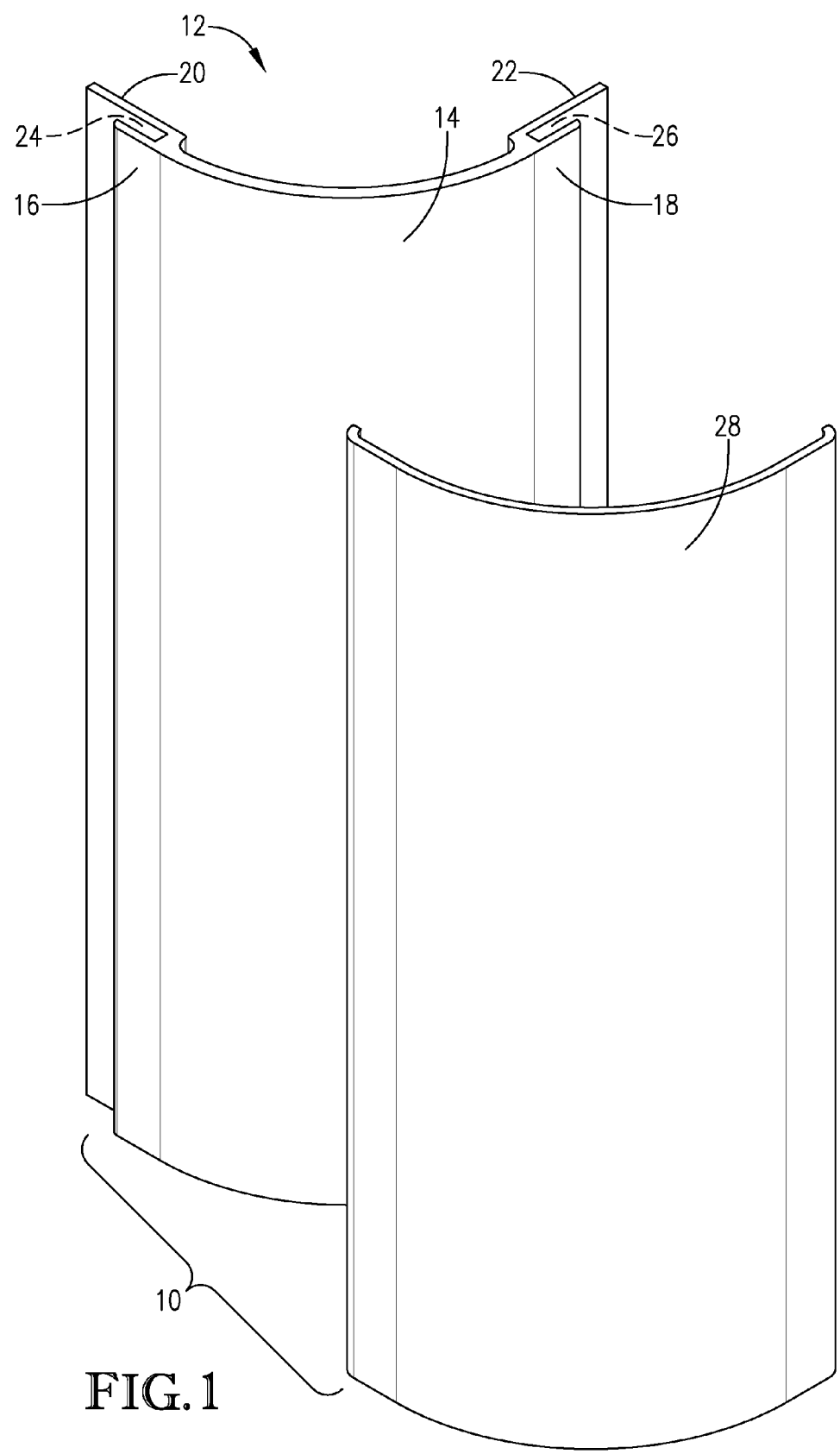
FIG. 1 is a front perspective view of a corner assembly in accordance with embodiments of the present invention, particularly showing an elongated cap section being separated from an elongated main portion.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 2:
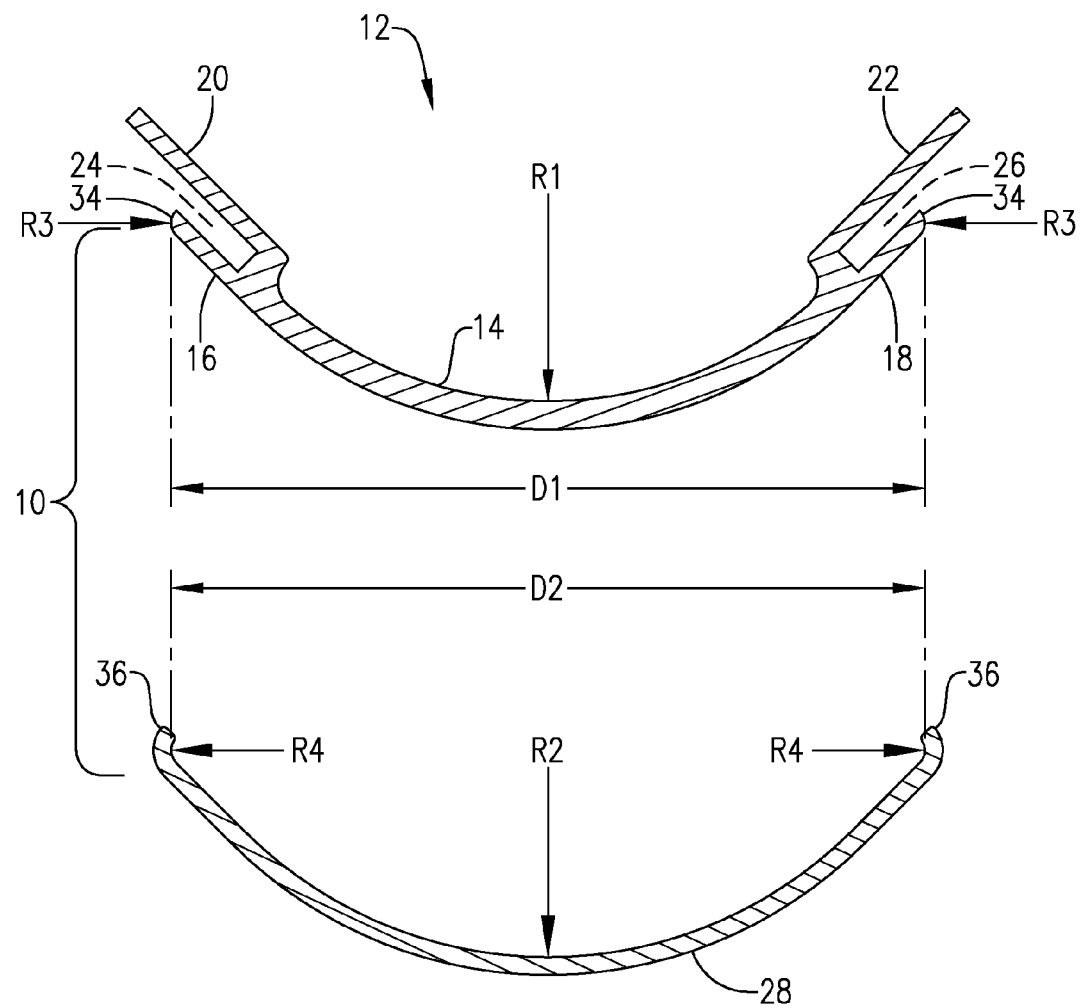
FIG. 2 is a top plan view of a corner assembly in accordance with embodiments of the present invention.

With reference to FIGS. 1-2, embodiments of the present invention include a corner assembly 10 comprising an elongated main portion 12 having a central section 14 opposed by first and second lip sections 16, 18. In certain embodiments, the first and second lip sections 16, 18 extend laterally from the central section 14. In addition, the corner assembly 10 may include first and second flange sections 20, 22 extending generally laterally from the central section 14, with the first flange section 20 extending generally parallel with the first lip section 16 and the second flange section 22 extending generally parallel with the second lip section 18. As such, the corner assembly 10 provides for the first flange section 20 to be separated from the first lip section 16 so as to present a first receiving channel 24 and the second flange section 22 to be separated from the second lip section 18 so as to present a second receiving channel 26. Furthermore, the corner assembly 10 may include an elongated cap section 28 operable to be securely positioned over the elongated main portion 12, as will be described in more detail below.

Figure 3:
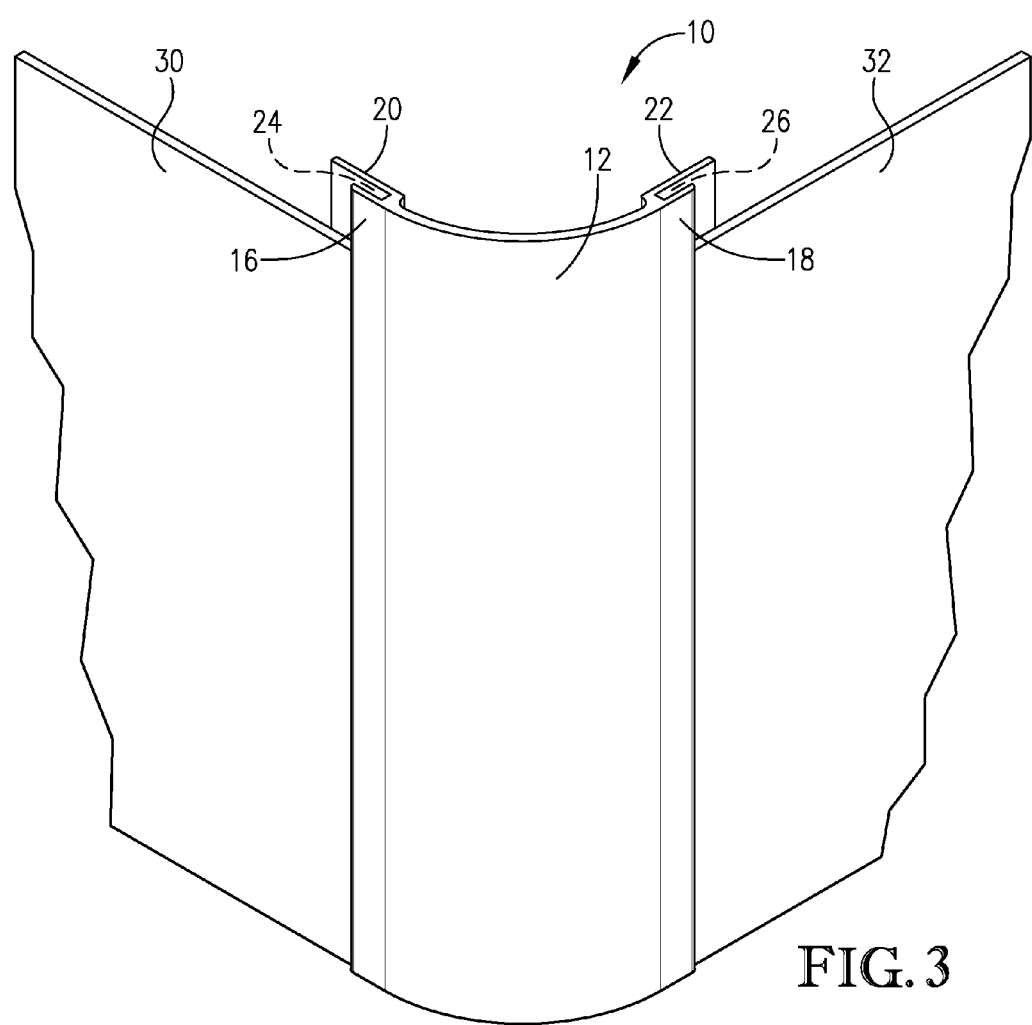
FIG. 3 is a front partial perspective view of the main portion of the corner assembly from FIGS. 1-2, with the main portion receiving two side panels from a piece of furniture.

The corner assembly 10 is operable to be used as a corner piece and/or joint for various types of furniture pieces used in vehicles. For example, and with reference to FIG. 3, the main portion 12 of the corner assembly 10 can be coupled with first and second side panels 30, 32 of a piece of furniture. In particular, the first and second side panels 30, 32 can be received within the first and second receiving channels 24, 26, such that the first and second side panels 30, 32 are joined together by the corner assembly 10 to form a portion of the piece of furniture. Although embodiments of the present invention provide for the corner assembly 10 to be used in an interior portion of a vehicle, it is understood that the corner assembly 10 may be used generally with other types of furniture pieces not included within a vehicle.

To form the piece of furniture, the side panels 30, 32 should be secured to the corner assembly 10 once they are received within the receiving channels 24, 26. Such securement can be performed by various methods of attachment, such as by weld, adhesive, or fasteners. For example, in some embodiments, the flange sections 20, 22 of the corner assembly 10 will include a plurality of openings formed therethrough, such that the side panels 30, 32 can be secured to the corner assembly 10 via fasteners extending through the openings and into the side panels 30, 32. In some embodiments, multiple side panels and corner assemblies will be required to be secured together so as construct the piece of furniture.

As will be described in more detail below, the main portion 12 can be formed, via extrusion from aluminum, or other natural or synthetic materials. The main portion 12 can be formed in various sizes so as to be used on furniture pieces of various sizes. For instance, in some embodiments, the main portion 12 may include a width (as measured from ends of the lip sections 16, 18) of between 1 to 6 inches, between 2 to 4 inches, or about 2.5 inches. The main portion 12 may, in some embodiments, include a length of between 3 inches to 6 feet, between 1 foot to 3 feet, or about 2 feet. In addition, some embodiments provide for the main portion 12 to include a thickness of between 0.001 to 0.5 inches, between 0.01 to 0.25 inches, or about 0.1 inches. In some embodiment, the lip sections 16, 18, which extend from the central section 14, may extend between 0.1 to 2 inches, between 0.2 to 1 inch, or about 0.375 inches from the central section 14. Furthermore, in some embodiments, the flange sections 20, 22 may extend between 0.5 to 4 inches, between 0.75 to 2 inches, or about 1 inch from the central section 14. The lip sections 16, 18 may be separated from their adjacent flange sections 20, 22, respectively, such that the receiving channels 24, 26 are between 0.1 to 3 inches, between 0.2 to 1 inch, or about 0.275 inches in width.

The cap section 28 may generally be complementary sized with the main portion 12. For instance, the cap section 28 may include a width (as measured from sides the cap section 28) of between 1 to 6 inches, between 2 to 4 inches, or about 2.5 inches. The cap section 28 may, in some embodiments, include a length of between 3 inches to 6 feet, between 1 foot to 3 feet, or about 2 feet. In addition, some embodiments provide for the cap section 28 to include a thickness of between 0.001 to 0.5 inches, between 0.01 to 0.25 inches, or about 0.1 inches. As such, and as will be described in more detail below, the cap section 28 is configured to be received over the main portion 12 of the corner assembly 10, such that the cap section 28 substantially covers the central section 14 and the lip sections 16, 18. As used herein, the term substantially covers means that the cap section 28 covers at least 90 percent of an exterior-facing surfaces of the central section 14 and the lip sections 16, 18. In some embodiments, the cap section 28 may cover 100 percent of the exterior-facing surfaces of the central section 14 and the lip sections 16, 18.

Figure 4:
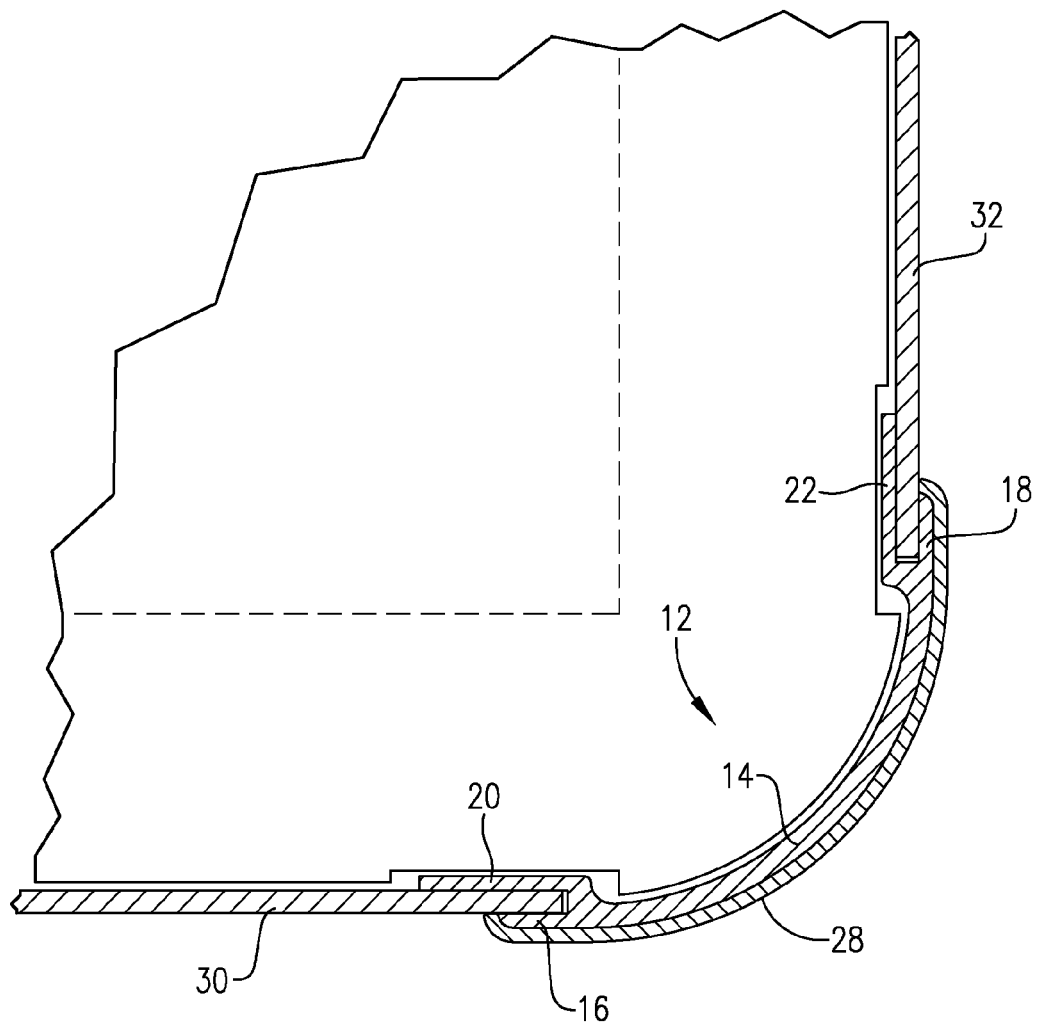
FIG. 4 is a top partial plan view of the main portion and the cap section of the corner assembly from FIGS. 1-2, with the cap section being received on the main portion, and with two side panels from a piece of furniture being received in the main portion.

Once a piece of furniture has been completely constructed, which includes securing the side panels 30, 32 with the corner assembly 10, the cap section 28 can be secured about a front face of the main portion 12 of the corner assembly 10. With reference to FIG. 4, embodiments of the present invention provide for the cap section 28 to be "snap fit" over the main portion 12, with such main portion 12 including the central section 14 and first and second lip sections 16, 18, as previously described. To facilitate the cap section 28 being operable to snap fit over the main portion 12, the cap section 28 may have dimensions that are at least nominally greater than the main portion 12. As used herein, the phrase nominally greater means no more than about 10 percent greater. For example, and as illustrated above in FIG. 2, the main portion 12 of the corner assembly 10 may be formed with a radial curve having a radius of curvature R1. In certain embodiments, the radius of curvature R1 may be between 0.5 inch to 3 inches, between 1 inch to 2 inches, or about 1.50 inches. Similarly, the cap section 28 may be formed with a radial curve including a radius of curvature R2 that matches and/or is generally equal to the radius of curvature R1 of the main portion 12. However, in certain embodiments, the cap section 28 may have a radius of curvature R2 that is nominally greater than the radius of curvature R1 of the main portion 12. For example, the main portion 12 may have a radius of curvature R1 of 1.5 inches, while the cap section 28 may have a radius of curvature R2 of 1.56 inches.

In addition, and with continued reference to FIG. 2, a linear distance D2 separating lateral edges of the cap section 28 may match and/or may be generally equal to a linear distance D1 separating a lateral edge of the first lip section 16 with a lateral edge of the second lip section 18. In alternative embodiments, the linear distance D2 may be nominally greater than a linear distance D1. As an illustrative example, the linear distance D2 from the lateral edges of the cap section 28 may be 2.6 inches, while the linear distance D1 from the lateral edge of the first lip section 16 to the lateral edge of the second lip section 18 may be 2.5 inches. Alternatively, or in addition, such linear distances D1, D2 may be between 1 inch and 5 inches, between 2 inches and 4 inches, or between 2.5 inches and 3.5 inches.

Furthermore, as shown in FIG. 2, lateral edges of the first lip section 16 and the second lip section 18 may each have a curved exterior surface 34. Correspondingly, lateral edges of the cap section 28 may be bent inward to form projections 36 extending along sides of the cap section 28. The curved exterior surfaces 34 of the first and second lip sections 16, 18 may present a radius curvature R3 and the projections 36 of the cap section 28 may form a radius of curvature R4 on the interior-facing surface of the cap section 28. In some embodiments, the radius of curvature R4 presented by the projections 36 may match and/or be generally equal to the radius of curvature R3 presented by the first and second lip sections 16, 18. In alternative embodiments, the radius of curvature R4 presented by the projections 36 may be nominally greater than the radius of curvature R3 presented by the first and second lip sections 16, 18. For example, the radius of curvature R4 may be 0.063 inches, while the radius of curvature R3 may be 0.060 inches. In other embodiments, such radius of curvatures R3, R4 may be between 0.010 inch and 0.100 inches, between 0.030 inches and 0.080 inches, or between 0.050 inches and 0.070 inches.

As such, with the cap section 28 having dimensions that match or that are nominally greater than that of the main portion 12 of the corner assembly 10, the cap section 28 is operable to snap fit over the main portion 12, such as is illustrated in FIG. 4. Specifically, the projections 36 of the cap section 28 are configured to securely fit (e.g., snap fit) over the curved exterior surfaces 34 of the main portion 12 so as to secure the cap section 28 in place. In alternative embodiments, the cap section 28 may otherwise be secured to the main portion 12 via welding or adhesives. For example, the cap section 28 may be secured to the main portion 12 via a double-sided tape applied between the cap section 28 and the main portion 12.

Figure 5:
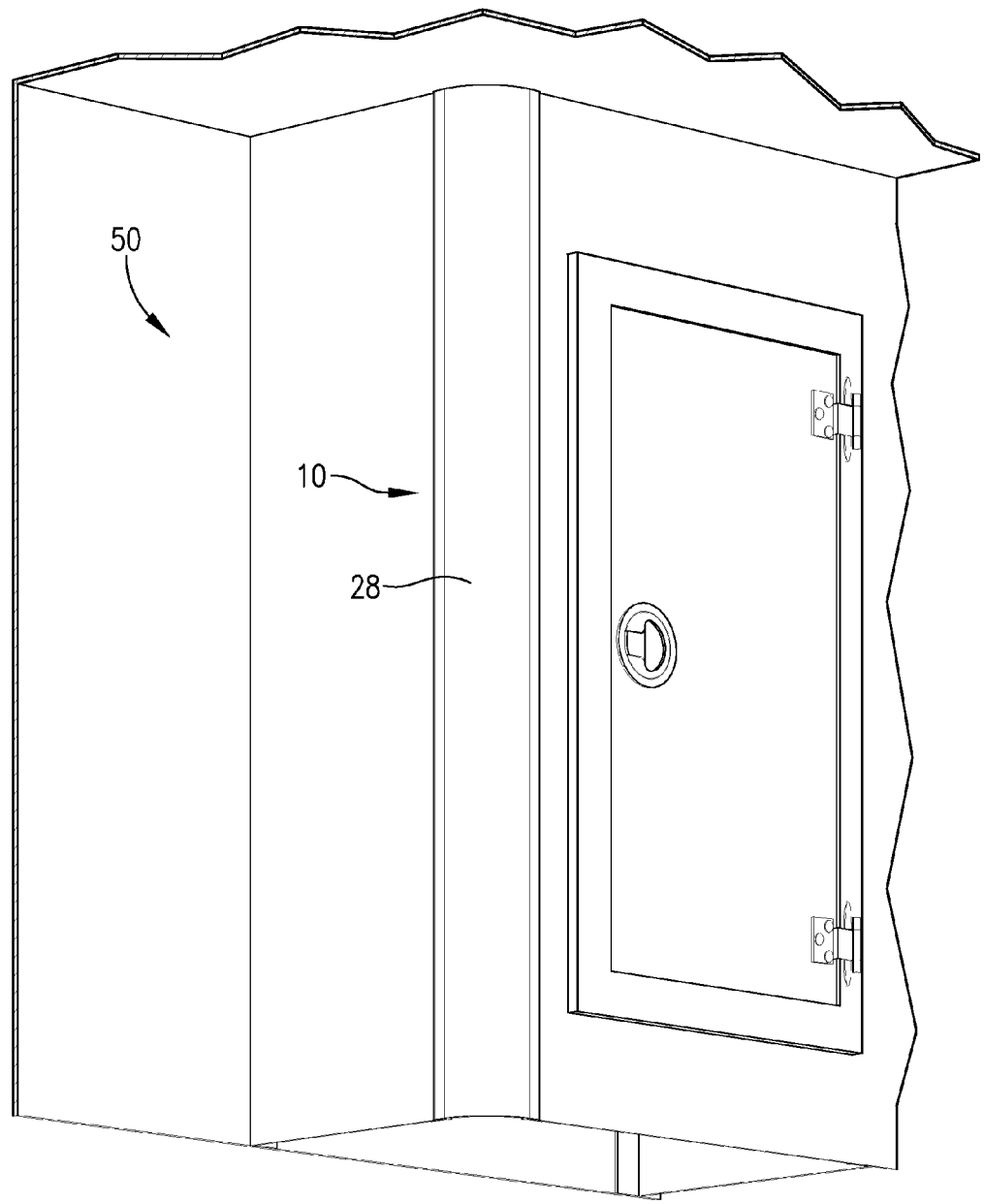
FIG. 5 is a partial perspective view of an interior of a vehicle, with the vehicle including a piece of furniture comprising the corner assembly from FIGS. 1-2 included therewith.

Given the description of the corner assembly 10 provided above, embodiments of the present invention include a method for fabricating furniture for an interior of a vehicle, with the furniture including curved corner joints formed from the corner assembly 10. For example, a cabinet 50 for use in an interior of an emergency vehicle, such as an ambulance, is illustrated in FIG. 5, with the cabinet 50 including a corner assembly 10. In certain embodiments, the components of the corner assembly 10, including each of the main portion 12 and the cap section 28, may be formed from aluminum, such as through an extrusion process. In other embodiments, the corner assembly 10 may be extruded from other materials, such as other metals, metal alloys, natural polymers, synthetic polymers, or the like. Similarly, the remaining components of the furniture, such as the side panels, may be formed from aluminum. In other embodiments, other materials may be used for the side panels of the furniture, such as a wood, polymers, or the like.

Given the above, the piece of furniture of embodiments of the present invention may be fabricated by securing the side panels to the main portion 12 of the corner assembly 10, as previously described. Subsequently, remaining components of the furniture (e.g., additional side panels, additional corner assemblies 10, a top panel, a bottom panel, a door, shelving, etc.) may also be fabricated and assembled. In embodiments, in which the piece of furniture is formed from aluminum, welding may be used to secure the components together during fabrication. Once the piece of furniture has been fabricated, it may need to have its exterior surface refinished, such as with paint, an overcoat, or the like. In some embodiments, the cap section 28 will not be attached to the main portion 12 of the corner assembly until after the piece of furniture is installed within a vehicle. Once fabrication of the piece of furniture is complete (excluding the attachment of the cap section 28 in some embodiments), the piece of furniture can be installed within the interior compartment of a vehicle. In some embodiments, the installation process of the piece of furniture within the vehicle will require welding. In other embodiments, the installation process will include standard fasteners, such as rivets, nut and bolts, or the like.

As previously noted, the exterior surface of the piece of furniture can be compromised (e.g., aesthetically degraded) during the above-described fabrication and installation processes. Nevertheless, embodiments of the present invention provide for the corner assembly 10 to maintain a preferred aesthetic appearance. In particular, if the piece of furniture's exterior was compromised during fabrication or installation, the cap section 28 can be installed over the main portion 12 of the corner assembly 10. In certain embodiments, the cap section 28 will be formed from aluminum during an extrusion process. Furthermore, the cap section 28 may be anodized so as to present a clean, shiny, smooth exterior surface. In other embodiments, the cap section 28 may be painted and/or otherwise coated with a plurality of colors that match the remaining component of the piece of furniture or that match an interior of the vehicle. As such, when the cap section 28 is coupled with the main portion 12, the corner assembly 10 will have a preferred aesthetic appearance. Furthermore, after use of the vehicle for an extended amount of time, the exterior surface of the piece of furniture, including the corner assembly 10, may become compromised, such as through scratches, dings, or the like. Nevertheless, embodiments of the present invention provide for the original cap section 28 of the corner assembly 10 to be removed and replaced with a new cap section 28, such that the corner assembly 10 will maintain a preferred aesthetic appearance. In particular, the original cap section 28 can be removed from the main portion 12 by forcing the projections 36 of the cap section 28 off and away from the curved exterior surfaces 34 of the main portion 12, such that the original cap section 28 can be removed from the main portion 12. Thereafter, a new cap section 28 can be installed over the main portion 12 by securing the projections 36 of the new cap section 28 to securely fit (e.g., snap-fit) over the curved exterior surfaces 34 of the main portion 12 so as to secure the new cap section 28 in place in place. In some embodiments, the new cap section 28 can be secured to the main portion 12 via adhesives, weld, or the like.

Although the invention has been described with reference to the preferred embodiment(s), it is noted that equivalents may be employed and substitutions made herein without departing from the scope of the invention. Thus, the invention described herein is entitled to those equivalents and substitutions that perform substantially the same function in substantially the same way.

Having thus described various embodiments of the invention, what is claimed as new and desired to be protected by Letters Patent includes the following:

1. A corner assembly comprising:
    an elongated main portion including—
        a central section opposed by a first lip section and a second lip section, wherein the first lip section extends laterally from the central section to a lateral edge, and wherein the second lip section extends laterally from the central section to a lateral edge;
        first and second flange sections extending generally laterally from the central section, with the first flange section extending generally parallel with the first lip section and the second flange section extending generally parallel with the second lip section,
        wherein the first flange section is separated from the first lip section so as to present a first receiving channel and the second flange section is separated from the second lip section so as to present a second receiving channel, wherein an interior-facing surface of the first lip section faces the first flange and an interior-facing surface of the second lip section faces the second flange section, and
    an elongated cap section operable to be securely positioned over the elongated main portion, wherein lateral sides of the cap section present lateral edges,
        wherein with the cap section securely positioned over the main portion, the lateral edges of the cap section contact the lateral edges of the main portion to secure the cap section to the main portion such that the an entire exterior-facing surface of the main portion is covered by the cap section, and wherein the cap section does not contact the interior-facing surfaces of the lip sections such that the cap section is removable from the main portion.

2. The corner assembly of claim 1, wherein the main portion has a first radius of curvature and the cap section has a second radius of curvature, and wherein the second radius of curvature is generally the same as or nominally greater than the first radius of curvature.

3. The corner assembly of claim 1, wherein the main portion and the cap section are extruded from aluminum.

4. The corner assembly of claim 3, wherein the cap section is anodized.

5. The corner assembly of claim 1, wherein a linear distance from a the lateral edge of the first lip section to the lateral edge of the second lip section is a first distance and a linear distance from the lateral edges of the cap section is a second distance, and wherein the second distance is greater than the first distance.

6. The corner assembly of claim 5, wherein the second distance is nominally greater than the first distance such that the cap section is operable to snap fit over the central section and the first and second lip sections.

7. The corner assembly of claim 5, wherein the lateral edges of the first lip section and the second lip section have a curved exterior surface, wherein the lateral edges of the cap section are bent inward to form projections extending along the lateral sides of the cap section, wherein the curved exterior surfaces of the first and second lip sections have a first radius of curvature and the projections of the cap section have a second radius of curvature, and wherein the second radius of curvature is nominally greater than the first radius of curvature so that the cap section is operable to snap fit over the central section and the first and second lips.

8. The corner assembly of claim 1, wherein the first and second receiving channels are sized so as to receive a side panel of a piece of furniture.

9. The corner assembly of claim 1, wherein a length of the cap section is generally equal to a length of the main portion.

10. The corner assembly of claim 1, wherein the cap section is securely positioned over the main portion via an adhesive applied between the cap section and the main portion.

11. A piece of furniture for an interior of a vehicle, the piece of furniture comprising:
    a first side panel;
    a second side panel; and
    a corner assembly comprising—
        an elongated main portion including a central section opposed by a first lip section and a second lip section, wherein the first lip section extends laterally from the central section to a lateral edge, and wherein the second lip section extends laterally from the central section to a lateral edge, and wherein the main portion further includes first and second flange sections extending generally laterally from the central section, wherein the first flange section extends generally parallel with the first lip section and the second flange section extends generally parallel with the second lip section, wherein the first flange section is separated from the first lip section so as to present a first receiving channel and the second flange section is separated from the second lip section so as to present a second receiving channel, wherein an interior-facing surface of the first lip section faces the first flange and an interior-facing surface of the second lip section faces the second flange section, and an elongated cap section operable to be securely positioned over the elongated main portion, wherein lateral sides of the cap section present lateral edges, wherein a portion of the first side panel is received within the first receiving channel and a portion of the second side panel is received within the second receiving channel, wherein with the cap section securely positioned over the main portion, the lateral edges of the cap section contact the lateral edges of the main portion to secure the cap section to the main portion such that the an entire exterior-facing surface of the main portion is covered by the cap section, and wherein the cap section does not contact the interior-facing surfaces of the lip sections such that the cap section is removable from the main portion.

12. The piece of furniture of claim 11, wherein the first and second side panels are formed from aluminum.

* * * * *